(12) United States Patent
Jimenez et al.

(10) Patent No.: US 10,226,118 B2
(45) Date of Patent: Mar. 12, 2019

(54) ORAL CARE IMPLEMENT HAVING MULTI-COMPONENT HANDLE

(71) Applicant: Colgate-Palmolive Company, New York, NY (US)

(72) Inventors: Eduardo Jimenez, Manalapan, NJ (US); Robert Moskovich, East Brunswick, NJ (US); Kenneth Waguespack, North Brunswick, NJ (US); Roger Kirchhofer, Lucerne (CH); Kurt Bieri, Lucerne (CH); Joachim Storz, Zell am See (AT); Andreas Wechsler, Zell am See (AT)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 15/539,504

(22) PCT Filed: Dec. 23, 2014

(86) PCT No.: PCT/US2014/072063
§ 371 (c)(1),
(2) Date: Jun. 23, 2017

(87) PCT Pub. No.: WO2016/105368
PCT Pub. Date: Jun. 30, 2016

(65) Prior Publication Data
US 2017/0347783 A1 Dec. 7, 2017

(51) Int. Cl.
*A46B 5/02* (2006.01)
*B29C 45/16* (2006.01)
(Continued)

(52) U.S. Cl.
CPC ............... *A46B 5/026* (2013.01); *A46B 5/02* (2013.01); *B29C 45/1676* (2013.01);
(Continued)

(58) Field of Classification Search
CPC ............ A46B 5/026; A46B 2200/1066; B29C 45/1676; B29C 2045/1681
See application file for complete search history.

(56) References Cited

U.S. PATENT DOCUMENTS

| 758,764 A | 5/1904 | MacLeod |
| 846,900 A | 3/1907 | Bloom |
| (Continued) | | |

FOREIGN PATENT DOCUMENTS

| AR | 71556 | 10/2003 |
| AR | 80042 | 11/2009 |
| (Continued) | | |

OTHER PUBLICATIONS

International Search Report and the Written Opinion issued in International Application PCT/US2010/046806 dated Mar. 16, 2011.
(Continued)

*Primary Examiner* — Shay Karls

(57) ABSTRACT

An oral care implement having a multi-component handle is disclosed. In one aspect, the oral care implement comprises: a handle comprising a first component constructed of a first material and a second component constructed of a second material; the first component comprising: first, second and third depressions formed into an outer surface of the first component; and a first through-hole extending from a floor of the second depression to a floor of the third depression, the first through-hole extending through sidewalls of the first depression; and the second component comprising: a first portion disposed within the first depression, a second portion disposed within the second depression, and a third portion disposed within the first depression; and the first, second and third portions connected together to form an integral mass of the second material.

20 Claims, 15 Drawing Sheets

(51) Int. Cl.
  *B29K 21/00* (2006.01)
  *B29K 23/00* (2006.01)
  *B29L 31/42* (2006.01)
(52) U.S. Cl.
  CPC .......... *A46B 2200/1066* (2013.01); *B29C 2045/1681* (2013.01); *B29K 2021/003* (2013.01); *B29K 2023/12* (2013.01); *B29L 2031/425* (2013.01)

(56) References Cited

U.S. PATENT DOCUMENTS

| | | |
|---|---|---|
| 1,125,532 A | 1/1915 | Himmel |
| 1,901,230 A | 3/1933 | Palmer |
| 1,924,152 A | 8/1933 | Coney et al. |
| 2,161,349 A | 6/1939 | Hadden |
| 2,186,005 A | 1/1940 | Casto |
| 2,305,461 A | 12/1942 | Spyra |
| D273,635 S | 5/1984 | Stocchi |
| 4,517,701 A | 5/1985 | Stanford, Jr. |
| 4,958,402 A | 9/1990 | Weihrauch |
| 5,144,712 A | 9/1992 | Hansel et al. |
| 5,339,482 A | 8/1994 | Desimone et al. |
| 5,392,483 A | 2/1995 | Heinzelman et al. |
| 5,584,690 A | 12/1996 | Maassarani |
| 5,604,951 A | 2/1997 | Shipp |
| 5,628,082 A | 5/1997 | Moskovich |
| 5,651,158 A | 7/1997 | Halm |
| D390,706 S | 2/1998 | Hohlbein et al. |
| 5,735,012 A | 4/1998 | Heinzelman et al. |
| 5,746,532 A | 5/1998 | Megill et al. |
| 5,758,383 A | 6/1998 | Hohlbein |
| 5,781,958 A | 7/1998 | Meessmann et al. |
| 5,799,353 A | 9/1998 | Yamamoto et al. |
| 5,802,656 A | 9/1998 | Dawson et al. |
| 5,839,149 A | 11/1998 | Scheier et al. |
| D404,205 S | 1/1999 | Hohlbein |
| D404,206 S | 1/1999 | Hohlbein |
| 5,862,559 A | 1/1999 | Hunter |
| 5,863,102 A | 1/1999 | Waguespack et al. |
| 5,908,038 A | 6/1999 | Bennett |
| 5,915,868 A | 6/1999 | Frazell |
| 5,930,860 A | 8/1999 | Shipp |
| 5,946,758 A | 9/1999 | Hohlbein et al. |
| 5,967,152 A | 10/1999 | Rimkus |
| 5,970,564 A | 10/1999 | Inns et al. |
| 5,984,935 A | 11/1999 | Budei et al. |
| 5,991,958 A | 11/1999 | Hohlbein |
| 6,015,293 A | 1/2000 | Rimkus |
| 6,032,313 A | 3/2000 | Tsang |
| 6,041,468 A | 3/2000 | Chen et al. |
| 6,073,299 A | 6/2000 | Hohlbein |
| 6,088,870 A | 7/2000 | Hohlbein |
| D429,887 S | 8/2000 | Hohlbein et al. |
| 6,099,780 A | 8/2000 | Gellert |
| 6,131,228 A | 10/2000 | Chen et al. |
| 6,178,583 B1 | 1/2001 | Volpenhein |
| 6,234,798 B1 | 5/2001 | Salazar et al. |
| 6,276,021 B1 | 8/2001 | Hohlbein |
| 6,292,973 B1 | 9/2001 | Moskovich et al. |
| D450,457 S | 11/2001 | Hohlbein |
| D450,929 S | 11/2001 | Angelini et al. |
| 6,314,606 B1 | 11/2001 | Hohlbein |
| D451,286 S | 12/2001 | Hohlbein |
| D456,138 S | 4/2002 | Hohlbein |
| D456,139 S | 4/2002 | Hohlbein |
| 6,370,726 B1 | 4/2002 | Kini et al. |
| D457,323 S | 5/2002 | Hohlbein |
| 6,397,425 B1 | 6/2002 | Szczech et al. |
| 6,408,476 B1 | 6/2002 | Cann |
| 6,421,867 B1 | 7/2002 | Weihrauch |
| D461,313 S | 8/2002 | Hohlbein |
| 6,442,786 B2 | 9/2002 | Halm |
| 6,442,787 B2 | 9/2002 | Hohlbein |
| D464,133 S | 10/2002 | Barnett et al. |
| 6,463,618 B1 | 10/2002 | Zimmer |
| D474,608 S | 5/2003 | Hohlbein |
| 6,564,416 B1 | 5/2003 | Claire et al. |
| 6,596,213 B2 | 6/2003 | Swenson |
| 6,595,087 B2 | 7/2003 | Whalen et al. |
| 6,599,048 B2 | 7/2003 | Kuo |
| 6,601,272 B2 | 8/2003 | Stvartak et al. |
| 6,658,688 B2 | 12/2003 | Gavney, Jr. |
| D486,649 S | 2/2004 | Sprosta et al. |
| 6,687,940 B1 | 2/2004 | Gross et al. |
| 6,749,788 B1 | 6/2004 | Holden et al. |
| 6,766,549 B2 | 7/2004 | Klupt |
| 6,792,642 B2 | 9/2004 | Wagstaff |
| 6,820,299 B2 | 11/2004 | Gavney, Jr. |
| 6,820,300 B2 | 11/2004 | Gavney, Jr. |
| 6,859,969 B2 | 3/2005 | Gavney, Jr. et al. |
| D503,538 S | 4/2005 | Desalvo |
| 6,886,207 B1 | 5/2005 | Solanki |
| 6,889,405 B2 | 5/2005 | Ritrovato et al. |
| 6,919,038 B2 | 7/2005 | Meyer et al. |
| 6,957,469 B2 | 10/2005 | Davies |
| D511,249 S | 11/2005 | Hohlbein |
| 6,972,106 B2 | 12/2005 | Huber et al. |
| D513,882 S | 1/2006 | Hohlbein et al. |
| 6,983,507 B2 | 1/2006 | McDougall |
| D514,320 S | 2/2006 | Hohlbein |
| D514,812 S | 2/2006 | Hohlbein et al. |
| 6,996,870 B2 | 2/2006 | Hohlbein |
| D516,819 S | 3/2006 | Hohlbein |
| D517,812 S | 3/2006 | Hohlbein et al. |
| D517,813 S | 3/2006 | Hohlbein et al. |
| 7,007,332 B2 | 3/2006 | Hohlbein |
| 7,020,928 B2 | 4/2006 | Hohlbein |
| D520,753 S | 5/2006 | Hohlbein |
| 7,047,591 B2 | 5/2006 | Hohlbein |
| 7,069,615 B2 | 7/2006 | Gavney, Jr. |
| 7,073,225 B1 | 7/2006 | Ford |
| D526,487 S | 8/2006 | Chenvainu et al. |
| 7,083,756 B2 | 8/2006 | Strahler |
| 7,089,621 B2 | 8/2006 | Hohlbein |
| D527,528 S | 9/2006 | Hohlbein |
| D528,803 S | 9/2006 | Hohlbein |
| D532,202 S | 11/2006 | Hohlbein |
| D532,607 S | 11/2006 | Hohlbein |
| 7,143,462 B2 | 12/2006 | Hohlbein |
| 7,146,675 B2 | 12/2006 | Ansari et al. |
| 7,168,125 B2 | 1/2007 | Hohlbein |
| 7,181,799 B2 | 2/2007 | Gavney, Jr. et al. |
| 7,182,542 B2 | 2/2007 | Hohlbein |
| 7,213,288 B2 | 5/2007 | Hohlbein |
| 7,219,384 B2 | 5/2007 | Hohlbein |
| 7,273,327 B2 | 9/2007 | Hohlbein et al. |
| D557,504 S | 12/2007 | Hohlbein |
| D557,505 S | 12/2007 | Hohlbein |
| 7,322,067 B2 | 1/2008 | Hohlbein |
| D562,560 S | 2/2008 | Hohlbein |
| 7,331,731 B2 | 2/2008 | Hohlbein et al. |
| 7,354,112 B2 | 4/2008 | Fischer et al. |
| 7,383,619 B2 | 6/2008 | Gross et al. |
| 7,386,909 B2 | 6/2008 | Hohlbein |
| 7,415,788 B2 | 8/2008 | Little |
| 7,458,125 B2 | 12/2008 | Hohlbein |
| 7,472,448 B2 | 1/2009 | Hohlbein et al. |
| 7,478,959 B2 | 1/2009 | Hohlbein |
| 7,480,955 B2 | 1/2009 | Hohlbein et al. |
| D589,260 S | 3/2009 | Hohlbein |
| 7,540,844 B2 | 6/2009 | Muser |
| D598,199 S | 8/2009 | Russell et al. |
| D598,654 S | 8/2009 | Huang |
| D599,556 S | 9/2009 | Russell et al. |
| 7,614,111 B2 | 11/2009 | Moskovich et al. |
| D609,915 S | 2/2010 | Erskine-Smith et al. |
| D612,611 S | 3/2010 | Brown, Jr. et al. |
| 7,712,175 B2 | 5/2010 | Blanchard et al. |
| 7,721,376 B2 | 5/2010 | Hohlbein et al. |
| 7,722,274 B2 | 5/2010 | Hohlbein et al. |
| 7,735,174 B2 | 6/2010 | Hohlbein et al. |
| D623,415 S | 9/2010 | Geiberger |
| 7,788,756 B2 | 9/2010 | Kraemer |

(56) References Cited

U.S. PATENT DOCUMENTS

| | | |
|---|---|---|
| 7,845,042 B2 | 12/2010 | Moskovich et al. |
| 7,854,036 B2 | 12/2010 | Georgi |
| 7,937,794 B2 | 5/2011 | Huber et al. |
| 7,954,191 B2 | 6/2011 | Hohlbein |
| 7,958,589 B2 | 6/2011 | Braun et al. |
| 7,975,343 B2 | 7/2011 | Hohlbein et al. |
| 7,975,346 B2 | 7/2011 | Moskovch et al. |
| 7,979,947 B2 | 7/2011 | Storkel et al. |
| 8,032,991 B2 | 10/2011 | Lawless |
| 8,042,217 B2 | 10/2011 | Sorrentino |
| 8,046,864 B2 | 11/2011 | Baertschi et al. |
| 8,060,972 B2 | 11/2011 | Geiberger et al. |
| 8,083,980 B2 | 12/2011 | Huber et al. |
| 8,239,996 B2 | 8/2012 | Garber et al. |
| 8,307,488 B2 | 11/2012 | Pfenniger et al. |
| 8,327,492 B2 | 12/2012 | Cann |
| 8,332,982 B2 | 12/2012 | Braun et al. |
| 8,332,985 B2 | 12/2012 | Solanki |
| 8,382,208 B2 | 2/2013 | Baertschi et al. |
| 8,448,284 B2 | 5/2013 | Gross et al. |
| 8,448,287 B2 | 5/2013 | Ponzini et al. |
| 8,458,846 B2 | 6/2013 | Schamberg et al. |
| 8,484,789 B2 | 7/2013 | Claire-Zimmet et al. |
| 8,500,766 B2 | 8/2013 | Jimenez et al. |
| 8,528,148 B2 | 9/2013 | Brown, Jr. et al. |
| 8,549,691 B2 | 10/2013 | Moskovich |
| 8,595,886 B2 | 12/2013 | Edelstein et al. |
| 8,601,635 B2 | 12/2013 | Goldman et al. |
| 8,608,251 B2 | 12/2013 | Nirwing et al. |
| 8,621,698 B2 | 1/2014 | Chenvainu et al. |
| 8,631,534 B2 | 1/2014 | Blanchard et al. |
| 8,732,890 B2 | 5/2014 | Mohr et al. |
| 8,739,351 B2 | 6/2014 | Kling et al. |
| 8,776,302 B2 | 7/2014 | Baertschi et al. |
| 8,813,292 B2 | 8/2014 | Driesen et al. |
| 8,813,296 B2 | 8/2014 | Rooney |
| 8,990,995 B2 | 3/2015 | Jimenez |
| 9,855,692 B2 | 1/2018 | Rooney |
| 10,010,164 B2 | 7/2018 | Rooney |
| 2002/0017003 A1 | 2/2002 | Kramer et al. |
| 2002/0138928 A1 | 10/2002 | Calabrese |
| 2003/0163881 A1 | 9/2003 | Driesen et al. |
| 2003/0178745 A1 | 9/2003 | Scarabelli et al. |
| 2003/0178885 A1 | 9/2003 | Weihrauch |
| 2004/0025275 A1 | 2/2004 | Moskovich et al. |
| 2004/0107521 A1 | 6/2004 | Chan et al. |
| 2004/0134007 A1 | 7/2004 | Davies |
| 2005/0166343 A1 | 8/2005 | Gavney, Jr. |
| 2005/0210612 A1 | 9/2005 | Hohlbein et al. |
| 2006/0048314 A1 | 3/2006 | Kressner |
| 2006/0048323 A1 | 3/2006 | Rueb |
| 2006/0064827 A1 | 3/2006 | Chan |
| 2006/0123574 A1 | 6/2006 | Storkel et al. |
| 2006/0236477 A1 | 10/2006 | Gavney, Jr. |
| 2006/0236478 A1 | 10/2006 | Hohlbein et al. |
| 2006/0248667 A1 | 11/2006 | Kraemer |
| 2007/0151058 A1 | 7/2007 | Kraemer et al. |
| 2007/0169295 A1 | 7/2007 | Winter et al. |
| 2007/0265555 A1 | 11/2007 | Deng |
| 2007/0283517 A1 | 12/2007 | Blanchard et al. |
| 2009/0007357 A1 | 1/2009 | Meadows et al. |
| 2009/0038097 A1 | 2/2009 | Geiberger |
| 2009/0158543 A1 | 6/2009 | Lee |
| 2009/0255077 A1 | 10/2009 | Mori et al. |
| 2010/0043162 A1 | 2/2010 | Kling et al. |
| 2010/0058550 A1 | 3/2010 | Ballmaier et al. |
| 2010/0088836 A1 | 4/2010 | Kirchhofer et al. |
| 2010/0101037 A1 | 4/2010 | Hilfiker et al. |
| 2010/0115724 A1 | 5/2010 | Huang |
| 2010/0180392 A1 | 7/2010 | Binet et al. |
| 2010/0223746 A1 | 9/2010 | Mueller |
| 2010/0263149 A1 | 10/2010 | Ballmaier et al. |
| 2010/0306941 A1 | 12/2010 | Erskine-Smith et al. |
| 2011/0030160 A1 | 2/2011 | Knutzen et al. |
| 2011/0047736 A1 | 3/2011 | Jimenez et al. |
| 2011/0138560 A1 | 6/2011 | Vitt et al. |
| 2011/0219558 A1 | 9/2011 | Vitt et al. |
| 2011/0109149 A1 | 12/2011 | Loetscher et al. |
| 2012/0034576 A1 | 2/2012 | Mostafa |
| 2012/0192369 A1 | 8/2012 | Mohr et al. |
| 2012/0255136 A1 | 10/2012 | Jimenez et al. |
| 2013/0007968 A1 | 1/2013 | Driesen et al. |
| 2013/0036566 A1 | 2/2013 | Schlatter |
| 2013/0139338 A1 | 6/2013 | Hess et al. |
| 2013/0269128 A1 | 10/2013 | Jimenez |
| 2013/0276252 A1* | 10/2013 | Xi .................. A46B 5/0029 15/105 |
| 2013/0291320 A1 | 11/2013 | Kirchhofer et al. |
| 2013/0333126 A1 | 12/2013 | Miller |
| 2014/0047656 A1 | 2/2014 | Newman et al. |
| 2014/0158152 A1 | 6/2014 | Kirchhofer et al. |
| 2014/0173838 A1 | 6/2014 | Dickie et al. |
| 2014/0173853 A1 | 6/2014 | Kirchhofer et al. |
| 2014/0298605 A1 | 10/2014 | Ivory |
| 2014/0310901 A1 | 10/2014 | Geiberger et al. |

FOREIGN PATENT DOCUMENTS

| | | |
|---|---|---|
| BR | 7900283 | 8/2000 |
| BR | DI 6601454-9 | 4/2006 |
| BR | DI 6702593 | 8/2007 |
| BR | DI 6805210-3 | 11/2008 |
| BR | DI 6902120-1 | 5/2009 |
| BR | DI 6903329-3 | 8/2009 |
| BR | DI 6903330-7 | 8/2009 |
| BR | DI 6904386 | 11/2009 |
| BR | DI 7102178-7 | 4/2011 |
| BR | 30 2013 000448-1 | 2/2013 |
| BR | DI 6401609-9 | 5/2014 |
| CH | 215110 | 6/1941 |
| CN | 3372860D | 6/2004 |
| CN | 3372861D | 6/2004 |
| CN | 2732059 | 10/2005 |
| CN | 300704339 | 10/2007 |
| CN | 201294969 | 8/2009 |
| CN | 201518876 | 7/2010 |
| CN | 201518877 | 7/2010 |
| CN | 201518880 | 7/2010 |
| CN | 201528796 | 7/2010 |
| CN | 201541995 | 8/2010 |
| CN | 201541996 | 8/2010 |
| CN | 201541997 | 8/2010 |
| CN | 201550827 | 8/2010 |
| CN | 301406316 S | 12/2010 |
| CN | 301421505 S | 12/2010 |
| CN | 201814085 | 5/2011 |
| CN | 201986933 | 9/2011 |
| CN | 301763519 | 12/2011 |
| CN | 30198826 | 5/2012 |
| CN | 302058056 | 9/2012 |
| CN | 302225957 S | 12/2012 |
| CN | 302328863 S | 2/2013 |
| CN | 202800555 | 3/2013 |
| CN | 103005839 | 4/2013 |
| CN | 203194906 | 9/2013 |
| CN | 203220069 | 10/2013 |
| CN | 203220073 | 10/2013 |
| CN | 203252150 | 10/2013 |
| CN | 302956580 S | 10/2014 |
| DE | 19858102 | 6/2000 |
| DE | 202005009026 | 10/2005 |
| DE | 102006016939 | 5/2007 |
| DE | 102006005616 | 8/2007 |
| DE | 102006024874 | 11/2007 |
| DE | 202008016004 | 2/2009 |
| EM | 000366984-0001 | 7/2005 |
| EM | 000638028-0002 | 12/2006 |
| EM | 001975079-0005 | 1/2012 |
| EM | 002163675-0002 | 1/2013 |
| EM | 002163675-0003 | 1/2013 |
| EM | 002212522-0004 | 4/2013 |
| EM | 002212522-0012 | 4/2013 |
| EM | 002424069-0001 | 3/2014 |
| EP | 0716821 | 6/1996 |

(56) References Cited

FOREIGN PATENT DOCUMENTS

| | | |
|---|---|---|
| EP | 0769920 | 9/2003 |
| EP | 2810581 | 12/2014 |
| ES | 1063617 | 11/2006 |
| IT | 2010PDO000035-0019 | 10/2010 |
| JP | H08164025 | 6/1996 |
| JP | 10042957 | 8/1996 |
| JP | D1314270 | 10/2007 |
| KR | 20040032038 | 4/2004 |
| KR | 838174 | 6/2007 |
| KR | 20-2012-0005449 | 7/2012 |
| MX | 32553 | 11/2009 |
| MX | 36113 | 4/2011 |
| MX | 36650 | 4/2011 |
| RU | 55985 | 1/2005 |
| RU | 79787 | 10/2011 |
| RU | 80086 | 11/2011 |
| RU | 81915 | 6/2012 |
| WO | WO1995/06420 | 3/1995 |
| WO | WO1995/10959 | 4/1995 |
| WO | WO1999/023910 | 5/1999 |
| WO | WO1999/55514 | 11/1999 |
| WO | WO1999/65358 | 12/1999 |
| WO | WO2000/49911 | 8/2000 |
| WO | WO2001/17392 | 3/2001 |
| WO | WO2001/29128 | 4/2001 |
| WO | WO2001/45573 | 6/2001 |
| WO | WO2001/182741 | 11/2001 |
| WO | WO2004/043669 | 5/2004 |
| WO | WO2005/122827 | 12/2005 |
| WO | WO2008/017996 | 2/2008 |
| WO | WO2011/070549 | 6/2011 |
| WO | WO2011/075133 | 6/2011 |
| WO | WO2012/017923 | 2/2012 |
| WO | WO2012/115035 | 8/2012 |
| WO | WO2012/176741 | 12/2012 |
| WO | WO2013/031685 | 3/2013 |

OTHER PUBLICATIONS

International Search Report and the Written Opinion issued in International Application PCT/US2012/070760 dated Oct. 14, 2013.
International Search Report and the Written Opinion issued in International Application PCT/US2014/072063 dated Oct. 1, 2015.

* cited by examiner

ORAL CARE IMPLEMENT HAVING MULTI-COMPONENT HANDLE

BACKGROUND

Oral care implements, such as toothbrushes, are mass-produced articles and must therefore allow cost-effective production. Toothbrushes made of a single plastic component and multiple plastic components, which are produced for example by two component injection molding processes, are known. In the latter case, known toothbrushes generally comprise two parts: a first part made of a hard plastic material, for example polypropylene; and a second part made of an elastomeric material, for example a thermoplastic elastomer. Typically, the first part, which is made of the hard plastic material, forms the structural portion of the handle and has a recess or channel formed therein. This recess is filled with the resilient plastic material, thereby forming the second part which acts as a gripping surface or cover.

The hard plastic and the elastomeric plastic are generally selected so that they bond with one another at the surface where the two plastic parts touch. In comparison with a toothbrush made of only one plastic material, this provides greater scope for design.

A need exists for an oral care implement, and method of manufacturing the same, that has a handle having greater design flexibility, is more cost-effective to mass produce, and/or affords comfort and control to the user during use.

BRIEF SUMMARY

Exemplary embodiments according to the present disclosure are directed to oral care implements having a multi-component handle.

In one embodiment, the invention can be an oral care implement comprising: a handle extending from a proximal end to a distal end along a longitudinal axis; a head at the distal end of the handle; the handle comprising a first component constructed of a first material and a second component constructed of a second material; the first component comprising: first, second and third longitudinally elongated depressions formed into an outer surface of the first component, the first, second and third longitudinally elongated depressions circumferentially spaced-apart from one another about the longitudinal axis; and a first through-hole extending from the second longitudinally elongated depression to the third longitudinally elongated depression, the first through-hole extending through the first longitudinally elongated depression; and the second component comprising: a first lobe portion disposed within the first longitudinally elongated depression, a second lobe portion disposed within the second longitudinally elongated depression, and a third lobe portion disposed within the first longitudinally elongated depression; and the first, second and third lobe portions connected together to form an integral mass of the second material.

In another embodiment, the invention can be an oral care implement comprising: a handle extending from a proximal end to a distal end along a longitudinal axis; a head at the distal end of the handle; the handle comprising a first component constructed of a first material and a second component constructed of a second material; the first component comprising: a body portion; and first, second and third longitudinal ribs extending from the body portion toward the proximal end of the handle; and the second component comprising: a first portion disposed between the first and third longitudinal ribs, a second portion disposed between first and second longitudinal ribs, and a third portion disposed between the second and third ribs.

In yet another embodiment, the invention can be a method of forming an oral care implement comprising: a) forming a first component of a first material, the first component comprising first, second and third longitudinally elongated depressions formed into an outer surface of the first component, the first, second and third longitudinally elongated depressions circumferentially spaced-apart from one another about a longitudinal axis of the first component, and a first through-hole extending from a floor of the second longitudinally elongated depression to a floor of the third longitudinally elongated depression, the first through-hole extending through sidewalls of the first longitudinally elongated depression; and b) forming a second component of a second material on the first component, the second component comprising a first lobe portion disposed within the first longitudinally elongated depression, a second lobe portion disposed within the second longitudinally elongated depression, and a third lobe portion disposed within the first longitudinally elongated depression, the first, second and third lobe portions connected together to form an integral mass of the second material.

In a further embodiment, the invention can be an oral care implement comprising: a handle comprising a first component constructed of a first material and a second component constructed of a second material; the first component comprising: first, second and third depressions formed into an outer surface of the first component; and a first through-hole extending from a floor of the second depression to a floor of the third depression, the first through-hole extending through sidewalls of the first depression; and the second component comprising: a first portion disposed within the first depression, a second portion disposed within the second depression, and a third portion disposed within the first depression; and the first, second and third portions connected together to form an integral mass of the second material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
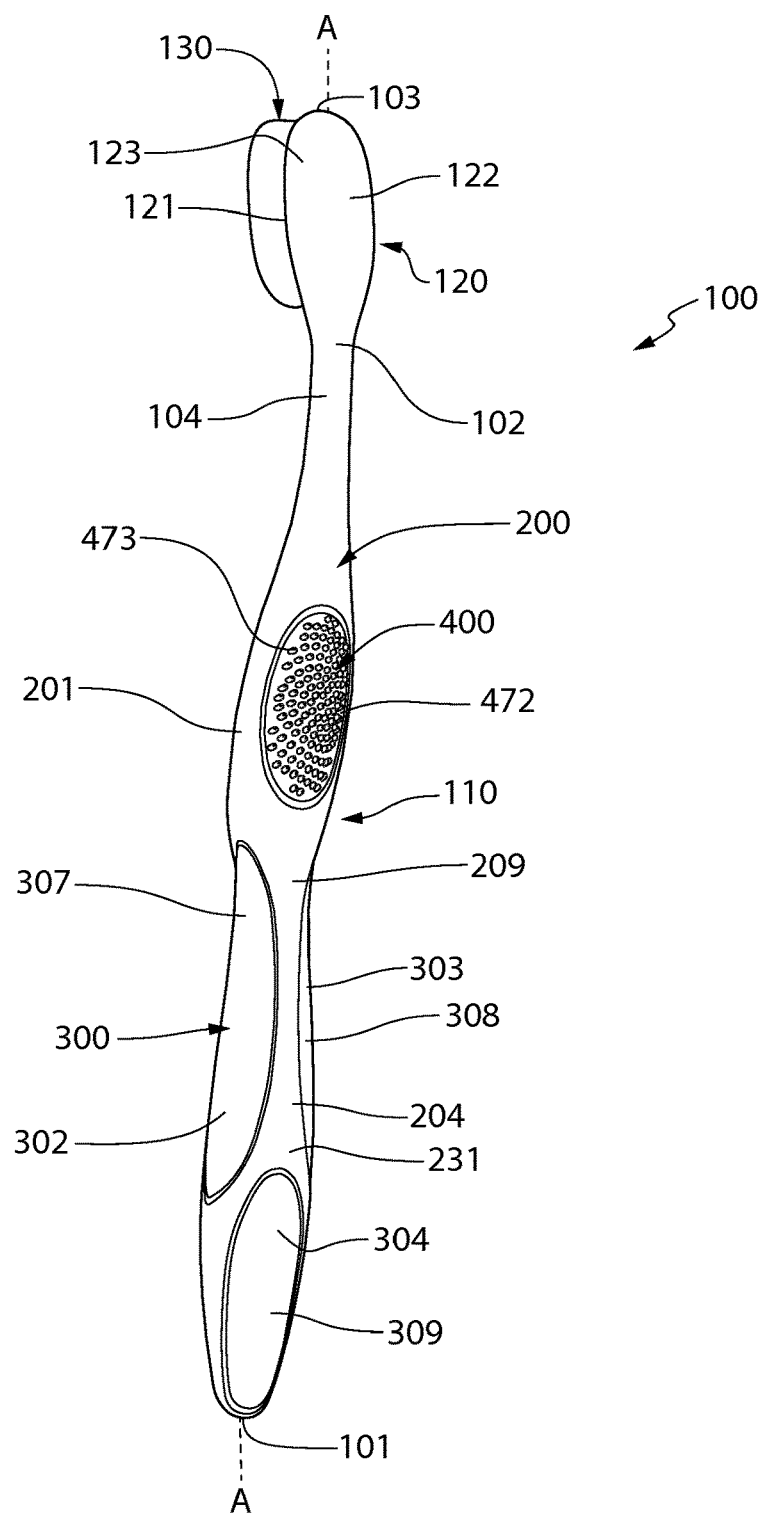
FIG. 1 is a rear perspective view of an oral care implement according to an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

In the following description, the invention is discussed in terms of a manual toothbrush, and method of manufacturing the same, having the inventive multi-component handle. However, in other forms, the invention could be in the form of other oral care implements including a soft-tissue cleansing implement, an inter-proximal pick, a flossing tool, a plaque scraper, a powered toothbrush, or other ansate implement designed for oral care. It is also to be understood that other embodiments may exist, and that structural and functional modifications may be made without departing from the scope of the present invention.

Figure 2:
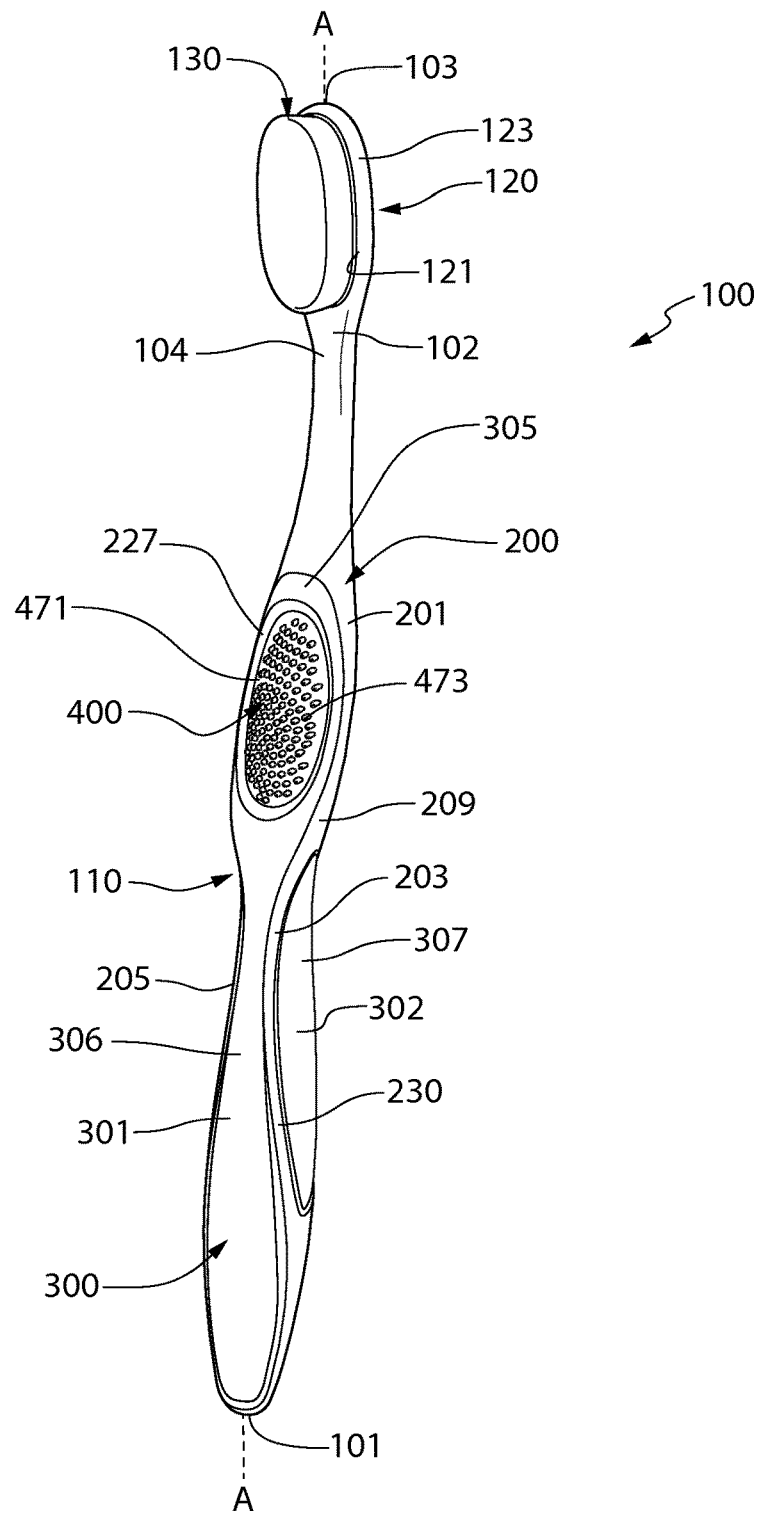
FIG. 2 is a front perspective view of the oral care implement of FIG. 1.
Figure 3:
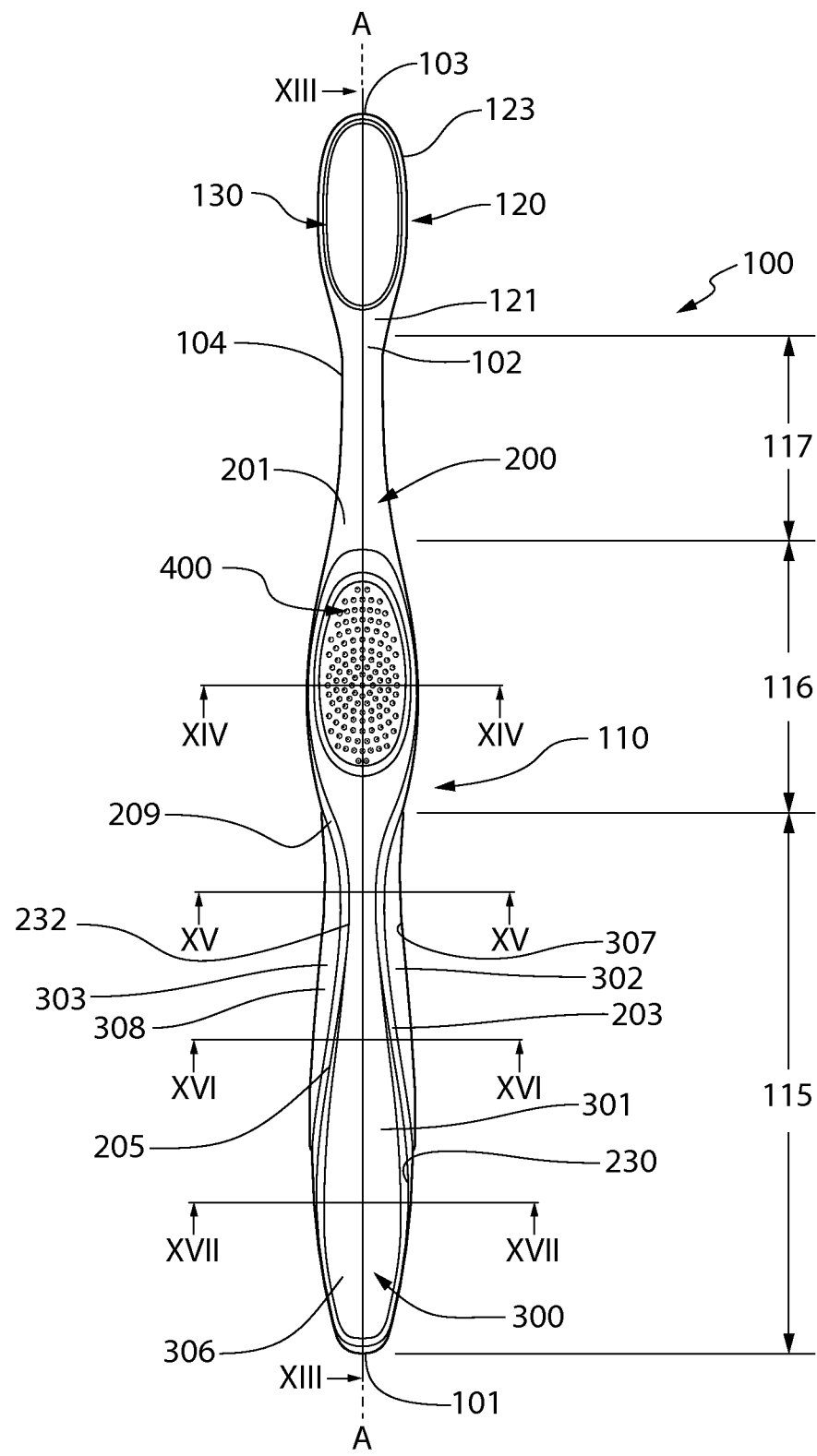
FIG. 3 is a front view of the oral care implement of FIG. 1.

Referring first to FIGS. 1-3 concurrently, a toothbrush 100 is illustrated according to one embodiment of the present invention. The toothbrush 100 generally comprises a handle 110 and a head 120. The handle 110 provides the user with a mechanism by which he/she can readily grip and manipulate the toothbrush 100. The handle 110 includes ergonomic features which provide a high degree of control for the user while maintaining comfort. The head 120 is connected to a distal end 102 of the handle 110 and includes a set of teeth cleaning elements 130, which are generically illustrated.

Generally, the toothbrush 100 extends from a proximal end 101 (which is also the proximal end of the handle 110) to a distal end 103 along a longitudinal axis A-A (which is also the longitudinal axis of the handle 110). Conceptually, the longitudinal axis A-A is a reference line that is generally coextensive with the three-dimensional center line of the handle 110 (and the body of the head 120). Because the handle 110 is a non-linear structure (as can be seen in FIGS. 1 and 2) in the illustrated embodiment, the longitudinal axis A-A for the toothbrush 100 (and the handle 110) is also non-linear in the illustrated embodiment. However, in certain other embodiments, the toothbrush 100 may have a simple linear arrangement and thus a substantially linear longitudinal axis A-A. As best visible in FIG. 14-17, the handle 110 has a generally elliptical transverse cross-sectional shape along its longitudinal length. Other transverse cross-sectional shapes can be used in other embodiments.

The head 120 is connected to the distal end 102 of the handle 110. As discussed in greater detail below, the head 120 and the handle 110 of the toothbrush 100 are preferably formed as a single-component integral structure using an injection molding process, which in the exemplified embodiment is the first component 200. More specifically, in the exemplified embodiment, the head 120 is integrally formed as part of the first component 200 of the handle 110. The first component 200 also comprises the neck 104 of the toothbrush 100. As exemplified, the neck 104 is a portion of the handle 110 of the toothbrush 100 that is narrowed relative to the head 120 and the gripping portion of the handle 110.

In other embodiments, the handle 110 and the head 120 may be formed as separate components which are operably connected at a later stage of the manufacturing process by any suitable technique known in the art, including without limitation thermal welding, sonic welding, a tight-fit assembly, a coupling sleeve, adhesion, or fasteners. Whether the head 120 is integrally formed as part of the first component 200 of the handle 110 or is a multi-piece assembly (including connection techniques) is not limiting of the present invention in all embodiments. Furthermore, other manufacturing techniques may be used in place of and/or in addition to injection molding to create the handle 110 and/or the head 120 (or components thereof), such as milling and/or machining.

The head 120 generally comprises a front surface 121 and a rear surface 122. The front surface 121 and the rear surface 122 of the head 120 can take on a wide variety of shapes and contours, none of which are limiting of the present invention. For example, the front and rear surfaces 121, 122 can be planar, contoured or combinations thereof. The front surface 121 and rear surface 122 are bound by a peripheral surface 123.

The set of tooth cleaning elements 130, which are generically illustrated as a block, are provided on and extend outward from the front surface 121 of the head 120 for cleaning contact with an oral surface, preferably teeth. While the set of tooth cleaning elements 130 is particularly suited for brushing teeth, the set of tooth cleaning elements 130 can also be used to clean oral soft tissue, such as a tongue, gums, or cheeks instead of or in addition to teeth. Common examples of "tooth cleaning elements" include, without limitation, filament bristles, fiber bristles, nylon bristles, spiral bristles, core-sheath bristles, rubber bristles, elastomeric protrusions, flexible polymer protrusions, co-extruded filaments, flag bristles, crimped bristles, anti-bacterial bristles and combinations thereof and/or structures containing such materials or combinations.

Figure 6:
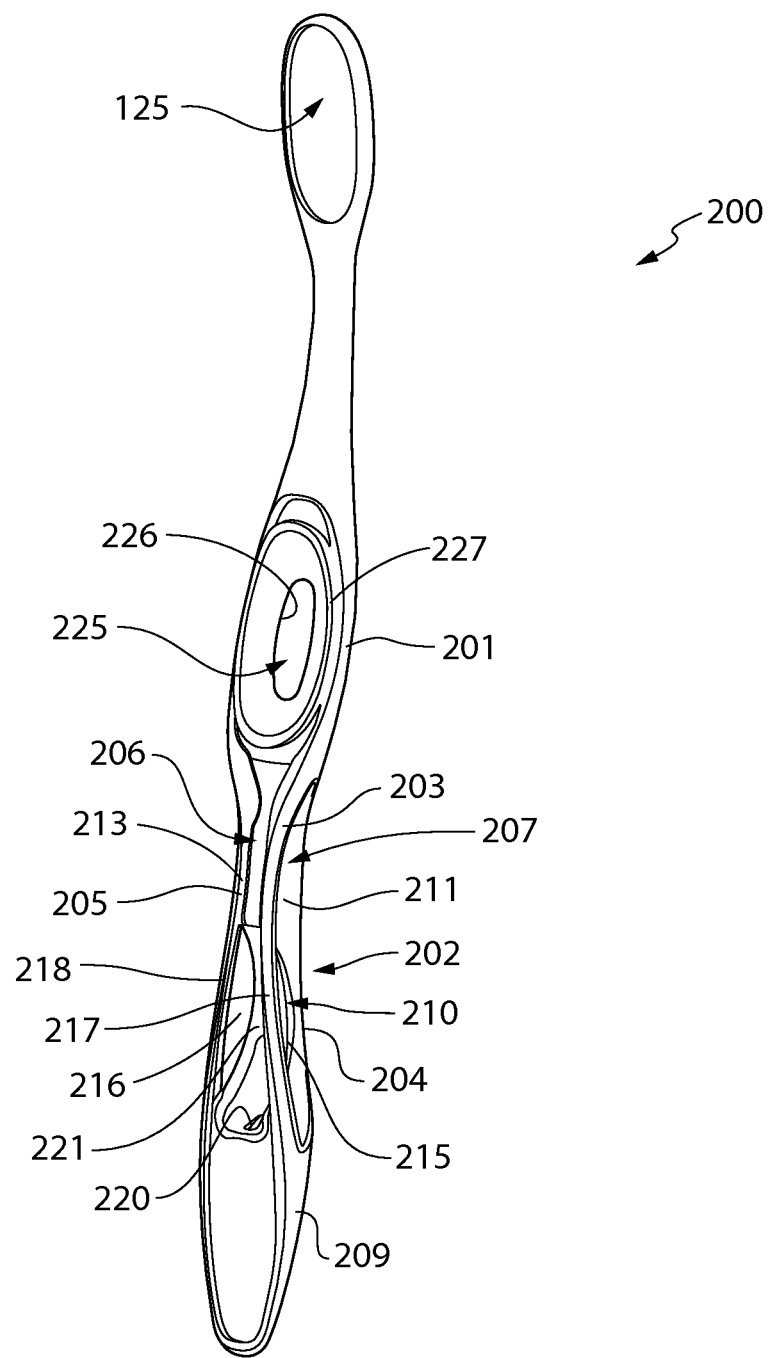
FIG. 6 is a front perspective view of a first component of the handle of the oral care implement of FIG. 1.
Figure 7:
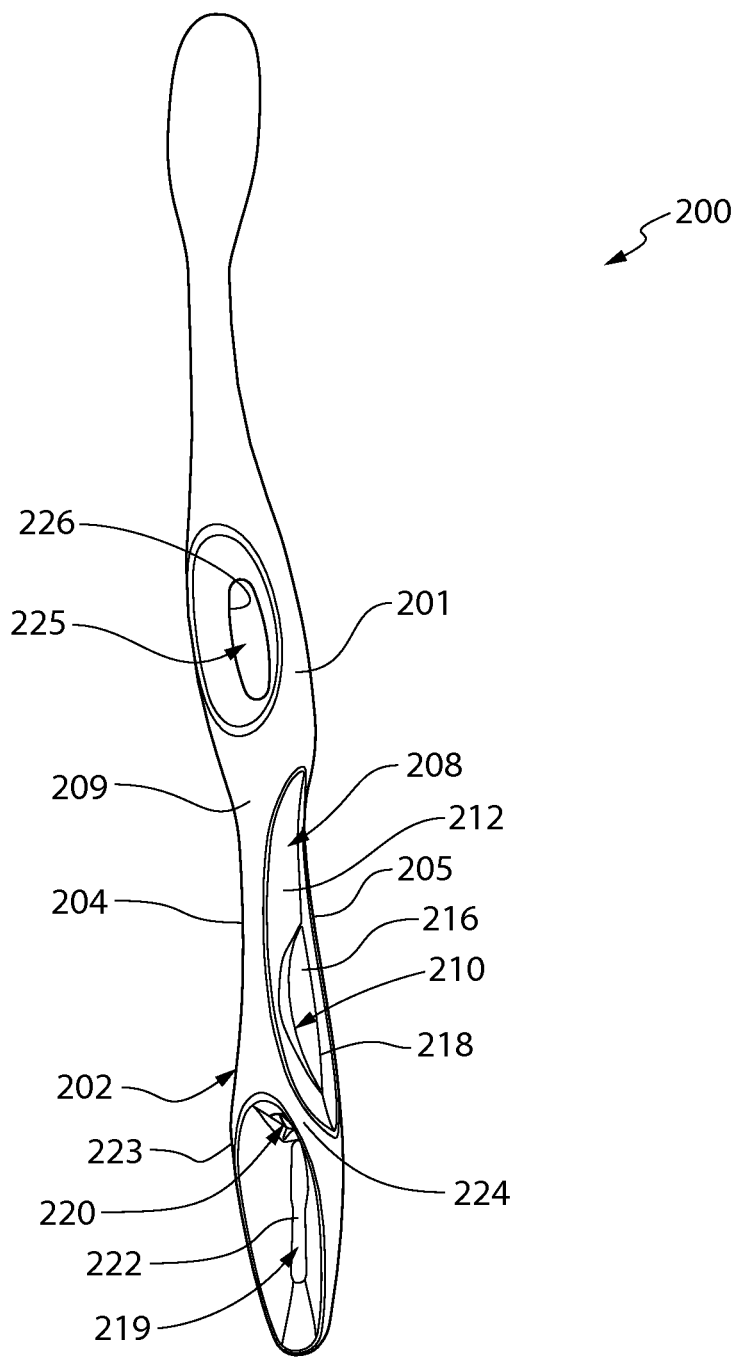
FIG. 7 is a rear perspective view of the first component of FIG. 6.
Figure 8:
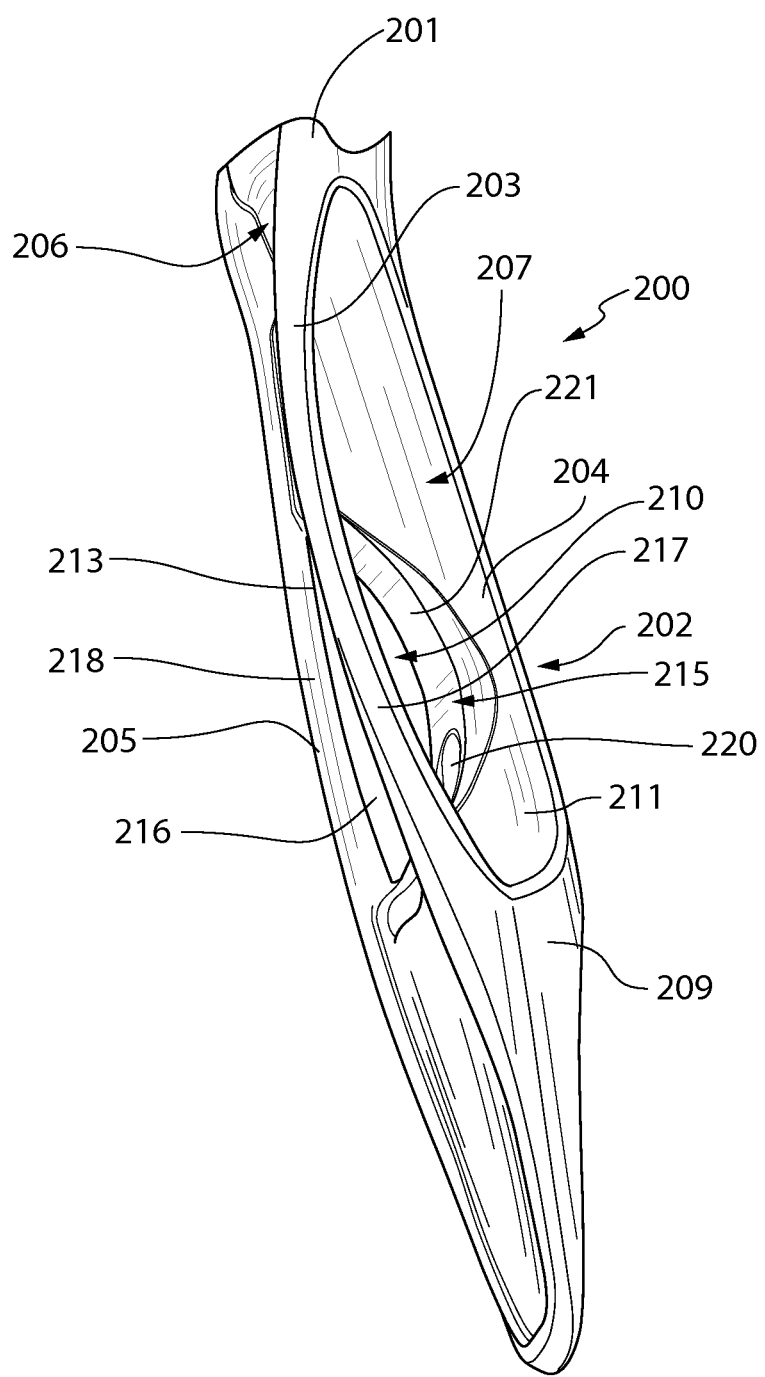
FIG. 8 is a right-side perspective view of a proximal portion of the first component of FIG. 6, wherein the left-side perspective view is a mirror image thereof.
Figure 9:
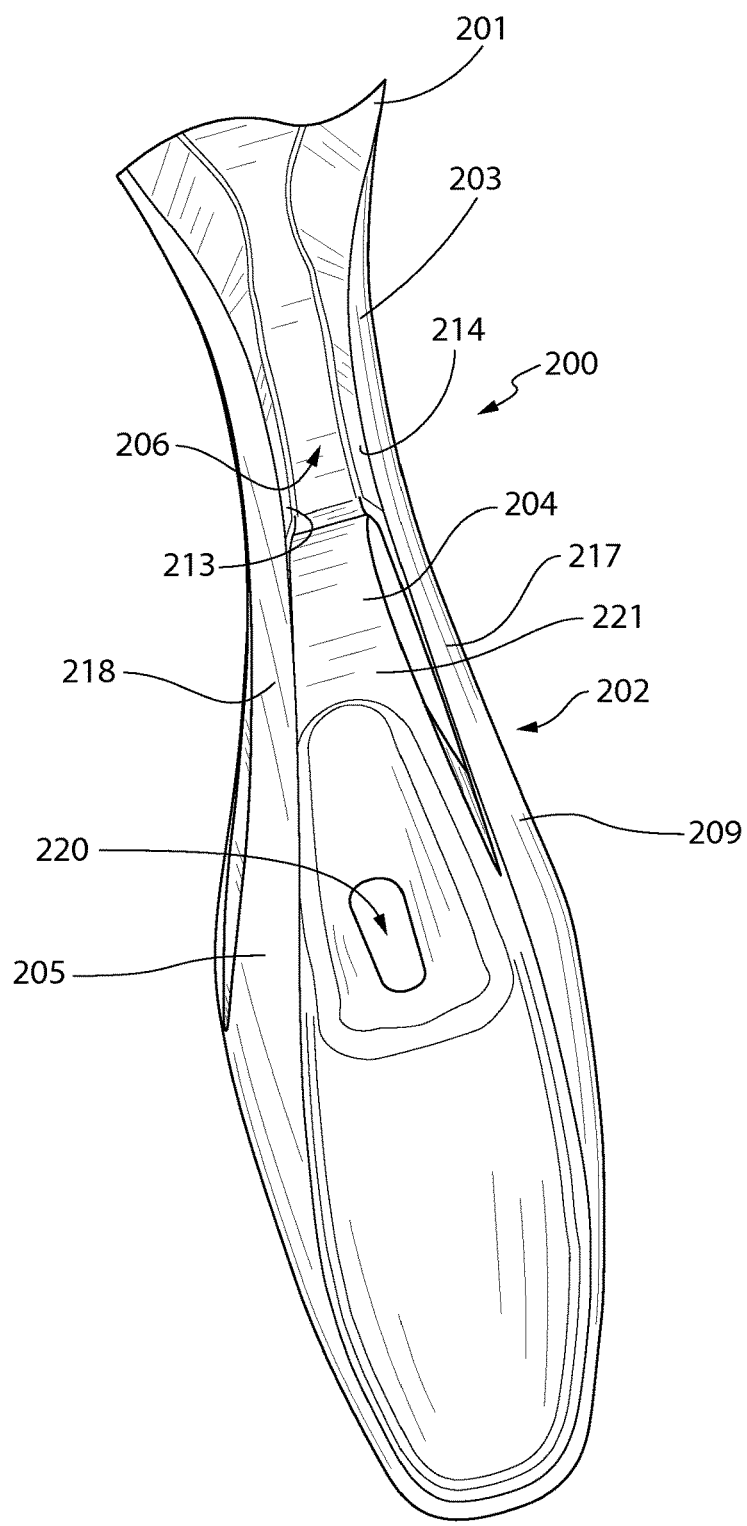
FIG. 9 is a front perspective view of the proximal portion of the first component of FIG. 6.
Figure 10:
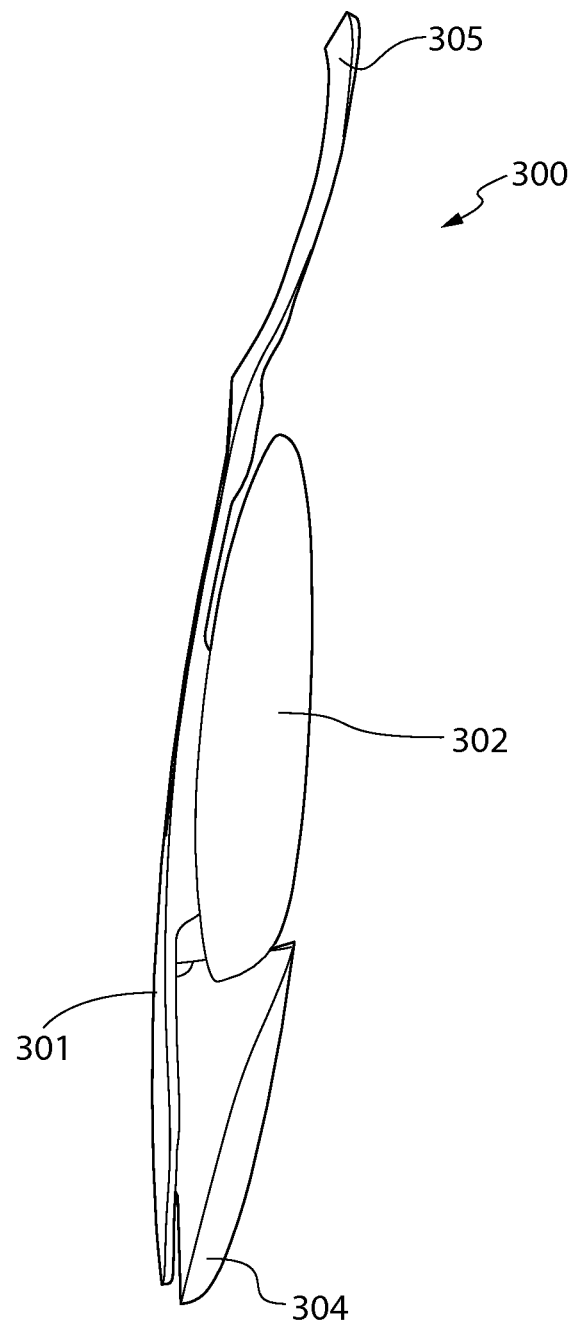
FIG. 10 is a right-side view of a second component of the handle of the oral care implement of FIG. 1, the left-side view being a mirror image thereof.
Figure 11:
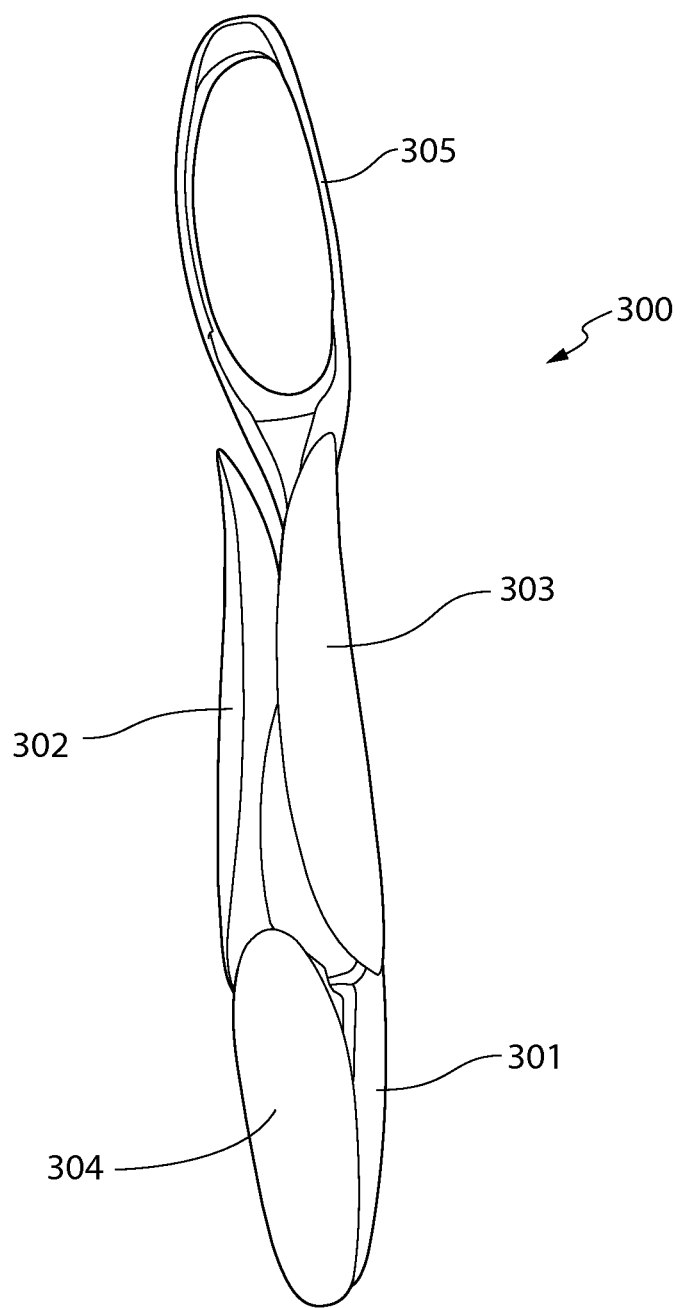
FIG. 11 is a rear perspective view of the second component of FIG. 10.
Figure 12:
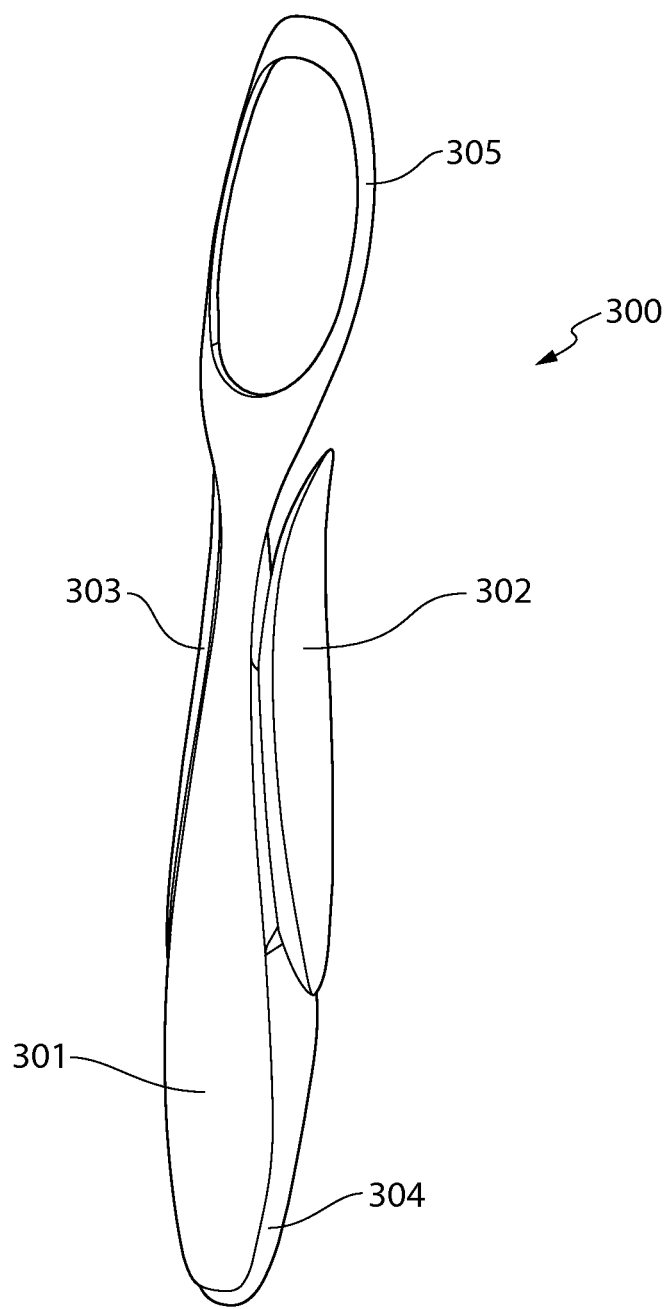
FIG. 12 is a front perspective view of the second component of FIG. 10.
Figure 13:
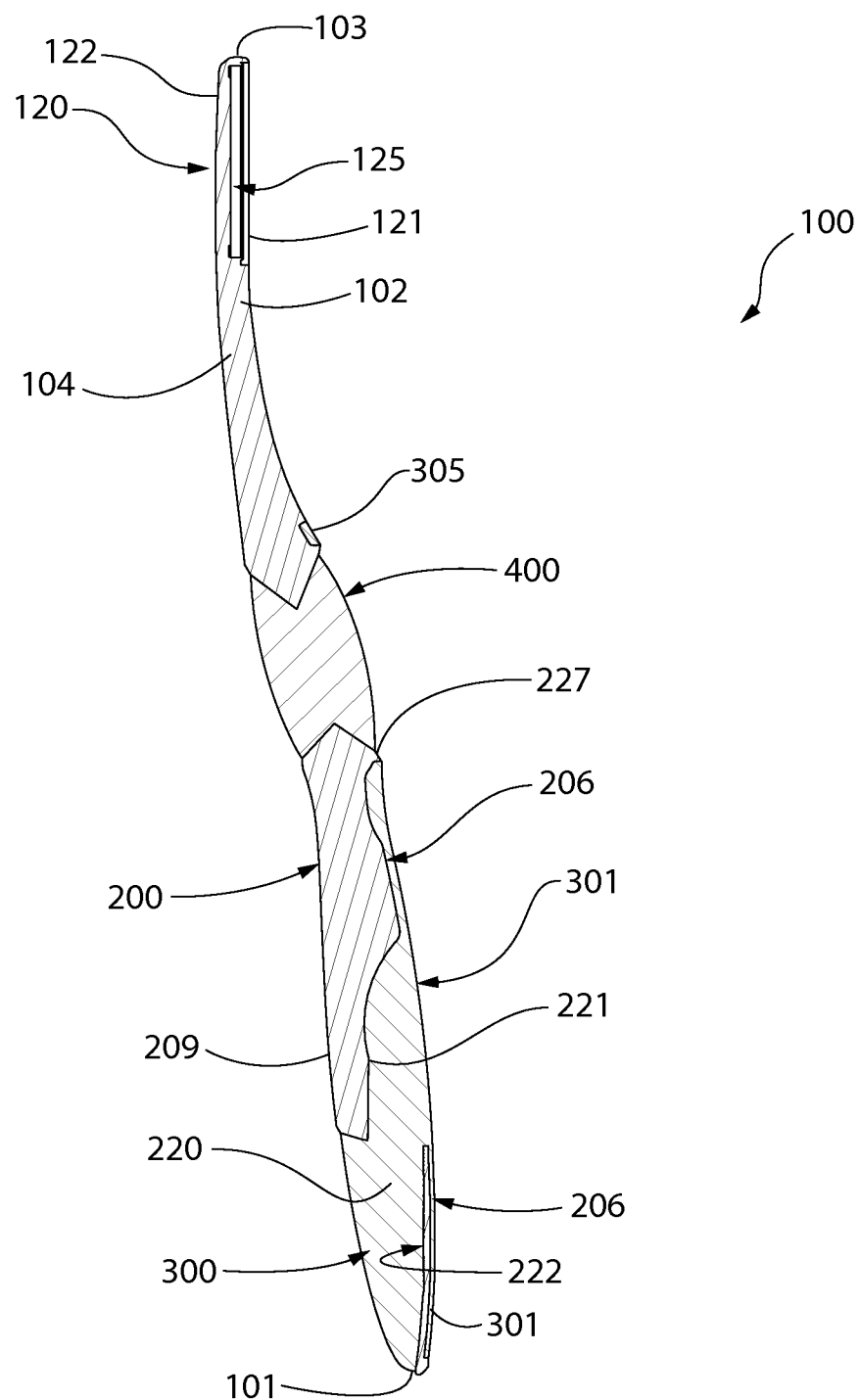
FIG. 13 is a longitudinal cross-sectional view of the oral care implement of FIG. 1 taken along view XIII-XIII of FIG. 3, wherein the tooth cleaning element assembly has been omitted.
Figure 14:
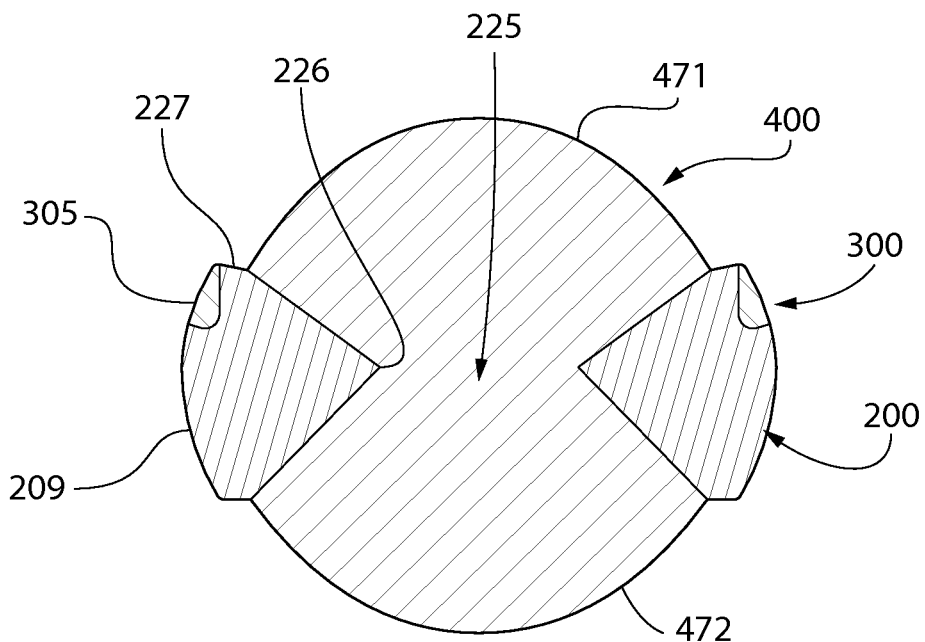
FIG. 14 is transverse cross-sectional view of the oral care implement of FIG. 1 taken along view XIV-XIV of FIG. 3.

The set of tooth cleaning elements 130 can be connected to the head 120 in any manner known in the art. In the exemplified embodiment (see FIGS. 6 and 13), anchor free tufting (AFT) is used to mount the cleaning elements. In this embodiment, the body of the head 120 comprises a depression (or basin) 125 for receiving a cleaning element assembly that comprises a carrier plate to which the tooth cleaning elements 130 are connected prior to being coupled to the body of the head 120. The carrier plate is then positioned within the depression 125 and secured to the body of the head 120, such as by ultrasonic welding, thermal fusion, mechanical fit or adhesion. The bristles (or elastomeric elements) of the set of tooth cleaning elements 130 extend through the carrier. The free ends of the set of tooth cleaning elements 130 on one side of the carrier plate perform the cleaning function. The ends of the set of tooth cleaning elements 130 on the other side of the carrier plate are melted together by heat, thereby retaining the set of tooth cleaning elements 130 in place.

In other embodiments, the set of tooth cleaning elements 130 can be mounted to tuft blocks or sections by extending through suitable openings in the tuft blocks so that the base of the bristles is mounted within or below the tuft block. In still another embodiment, tuft holes may be formed in the body of the head and staples, or other anchors, can be used to secure the bristles tufts therein.

While not in the exemplified embodiment, the rear surface 122 of the head 120 may also comprise additional structures for oral cleaning, such as a soft tissue cleanser, in other embodiments. Such soft tissue cleansers are typically constructed of a thermoplastic elastomer (TPE) and include one or more projections, such as nubs and/or ridges, for engaging and massaging soft oral tissue, such as the tongue.

As shown in FIG. 3, the handle 110 can be conceptually delineated in longitudinal sections comprising a proximal section 115, a middle section 116 and a neck section 117. The proximal section 115 is the portion or segment of the handle 110 that generally fits comfortably within the palm of the user. The middle section 116 forms the portion or segment of the handle 110 that generally fits comfortably between the user's thumb and index finger. The neck portion 117 forms the portion or segment of the handle 110 that connects to the head 120.

The proximal section 115 longitudinally extends from the proximal end 101 of the toothbrush 100 to the middle section 116. The middle section 116 longitudinally extends from the proximal section 115 to the neck section 117. The neck section 117 extends from the middle section 116 to the head 120. While the head 120 is illustrated as being widened relative to the neck section 117 of the handle 110, the head 120 could in some constructions simply be a continuous extension or narrowing of the neck section 117 of the handle 110.

As discussed in greater detail below, the first component 200 is located within (and forms a part of) each of the proximal section 115, the middle section 116 and the neck section 117. The second component 300 is located within (and forms part of) each of the proximal section 115 and the middle section 116. Moreover, in the exemplified embodiment, the second and third components 300, 400 are not located within the neck section 117. The third component 400 is located within (and forms part of) the middle section 116. As exemplified, the third component is only located within (and forms part of) the middle section 116.

Figure 4:
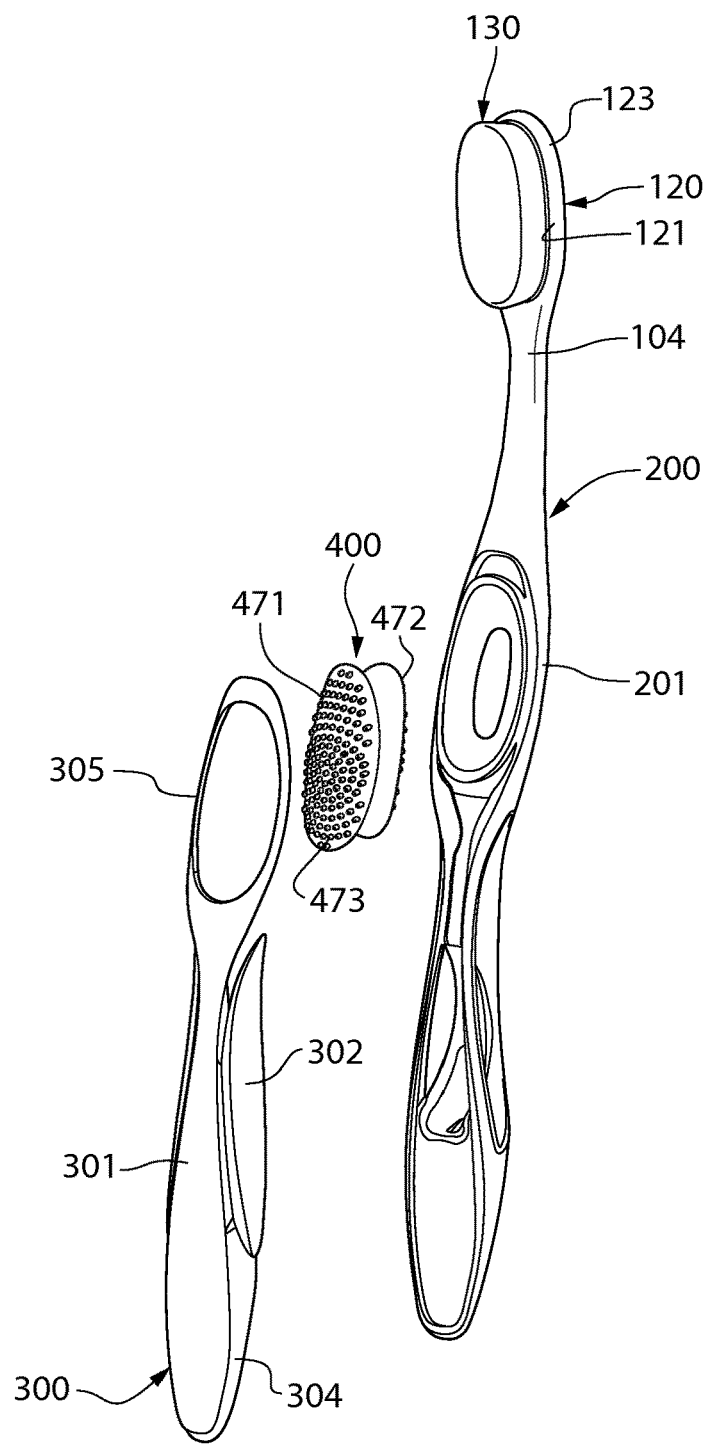
FIG. 4 is a front perspective of the oral care implement of FIG. 1 with the handle in an exploded state.
Figure 5:
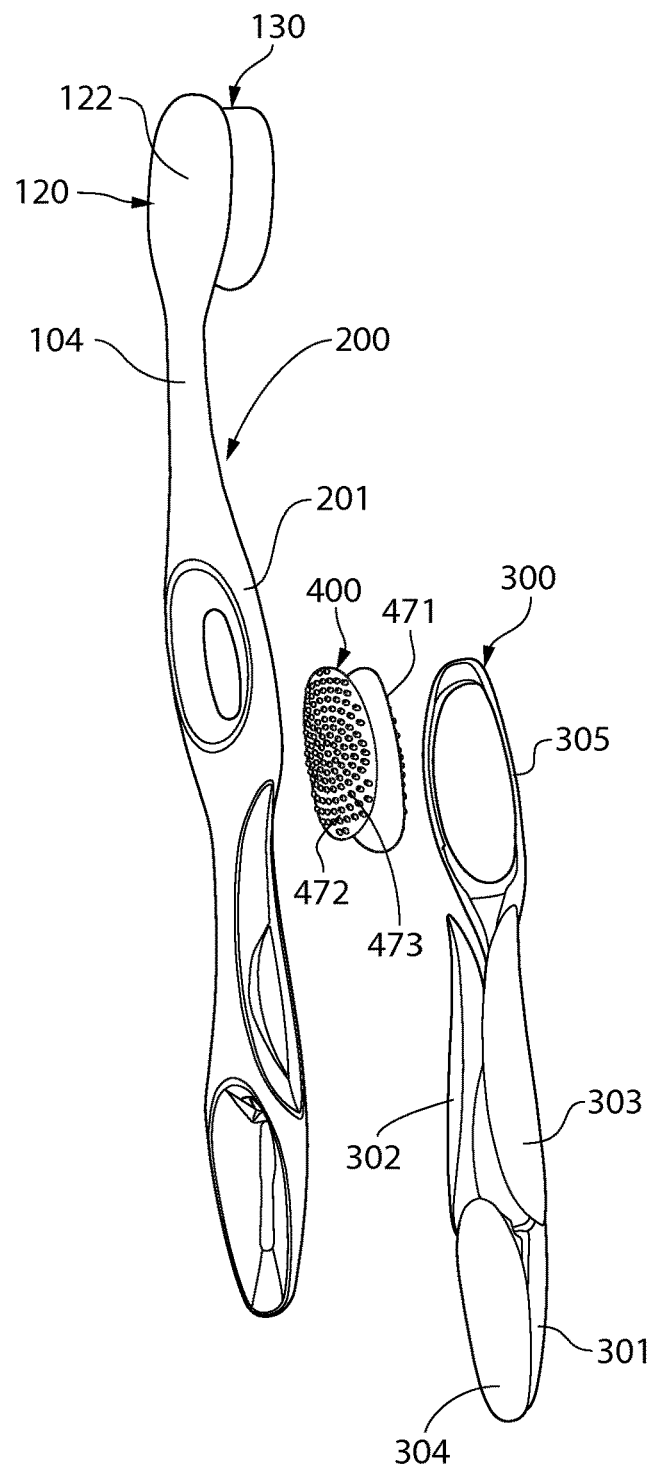
FIG. 5 is a rear perspective of the oral care implement of FIG. 1 with the handle in an exploded state.

Referring now to FIGS. 4-5 concurrently, the handle 110 is illustrated in an exploded state so that its three components are visible. The three components of the handle 110 include a first component 200, a second component 300 and a third component 400. In certain embodiments, the first component 200 can be considered the frame or base structure of the handle 110, the second component 300 can be considered a cushioning or compressible structure, and the third component can be considered a thumb and finger grip body. While three components 200, 300, 400 are exemplified as forming the multi-component handle 110, in other embodiments of the multi-component handle 110 of the toothbrush 100, the third component 400 may be omitted if desired. In one such embodiment, the first component 200 can be modified to assume the volume of the omitted third component 400. In still another such embodiment, the second component 300 can be modified to assume the volume of the omitted third component 400. In still other embodiments, the multi-component handle 110 of the toothbrush 100 may further comprise one or more additional components (in addition to the first, second and third components 200, 300, 400).

In one embodiment, each of the first, second, and third components 200, 300, 400 is an integrally formed single-component structure. One suitable forming method for forming the first, second and third components 200, 300, 400 as integral structures is injection molding. Of course, in certain other embodiments, other forming techniques may be utilized, such as machining and/or milling. In one embodiment, the first component 200 is formed of a first material, the second component 300 is formed of a second material, and the third component 400 is formed of a third material. In certain embodiments, the first material is different than the second material. In other embodiments, each of the first, second and third materials are different from one another. In one embodiment, the first material has a first hardness durometer, the second material has a second hardness durometer, and the third material has a third hardness durometer, wherein the first hardness durometer is greater than the second hardness durometer and the second hardness durometer is greater than the third hardness durometer.

In the exemplified embodiment, the first material of which the first component 200 is constructed is a hard material. One suitable hard material is a hard plastic. Suitable hard plastics for formation of the first component 200 include, without limitation, polyethylene, polyethylene terephthalate, polypropylene (PP), polyamide, polyester, cellulosics, SAN, acrylic, ABS, BR or any other of the hard plastics used in toothbrush manufacture. As used herein, the term "plastic" may include a blend of different plastics or copolymers.

In the exemplified embodiment, the second material of which the second component 300 is constructed is a first elastomeric material, such as a thermoplastic elastomer (TPE). The first elastomeric material of the second component 300, in certain embodiments, has a hardness durometer in a range of A13 to A50 Shore hardness, although materials outside this range may be used. In one specific embodiment, the hardness durometer of the first elastomeric material of the second component 300 is A25 to A40 Shore hardness.

In the exemplified embodiment, the third material of which the third component 400 is constructed is a second elastomeric material, such as a thermoplastic elastomer (TPE). In certain embodiments, the second elastomeric material of the third component may have a hardness durometer in a range of A11 to A15 Shore hardness. Of course, materials outside this hardness range could be used. As an example, one potential first elastomeric material for the third component 400 can be styrene-ethylene/butylene-styrene (SEBS) manufactured by GLS Corporation. Nevertheless, other manufacturers can supply the SEBS material and other materials could be used.

In certain embodiments, the first component 200 is constructed of a first hard plastic and the second component 300 is constructed of a first elastomeric material that are chemically compatible with one another such that they form a chemical bond with each other during an injection molding process. Moreover, in certain embodiments, the third component 400 is constructed of a second elastomeric material that is chemically compatible with the first hard plastic of the first component 200 such that they also form a chemical bond with each other during an injection molding process.

In certain embodiments, the first material (such as the hard plastics discussed above) of which the first component 200 is constructed is opaque while the second material of which the second component 300 is constructed is transparent (or light transmissive). As used herein, the term "transparent" includes materials that are color tinted but still allow light to transmit therethrough. One suitable opaque hard plastic is opaque PP. However, opaque versions of the hard plastics listed above for the first component 200 may also be used. One suitable transparent elastomeric materials includes a transparent TPE.

Referring now to FIGS. 6-9 and 13-17 concurrently, the first component 200 and its structural cooperation with the second and third components 300, 400 will be described in greater detail. The first component 200 generally comprises a body portion 201 and a frame portion 202. The frame portion 202 comprises a first longitudinal rib 203, a second longitudinal rib 204, and a third longitudinal rib 205. The first, second and third longitudinal ribs 203-205 extend from the body portion 201 toward the proximal end 101 of the handle 110. As a result of the first, second and third longitudinal ribs 203-205: a first depression 206 is formed into an outer surface 209 of the first component 200 between the first and third longitudinal ribs 203, 205; a second depression 207 is formed into the outer surface 209 of the first component 200 between the first and second longitudinal ribs 203, 204; and a third depression 208 is formed into the outer surface 209 of the first component 200 between the second and third longitudinal ribs 204, 205. The first longitudinal rib 203 separates the first and second depressions 206, 207, the second longitudinal rib 204 separates the second and third depressions 207, 208, and the third longitudinal rib 205 separates the third and first depressions 208, 206.

Figure 15:
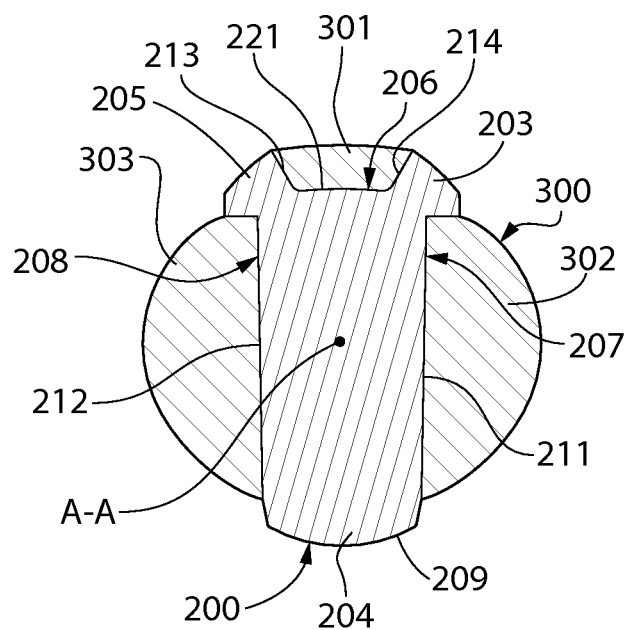
FIG. 15 is transverse cross-sectional view of the oral care implement of FIG. 1 taken along view XV-XV of FIG. 3.
Figure 16:
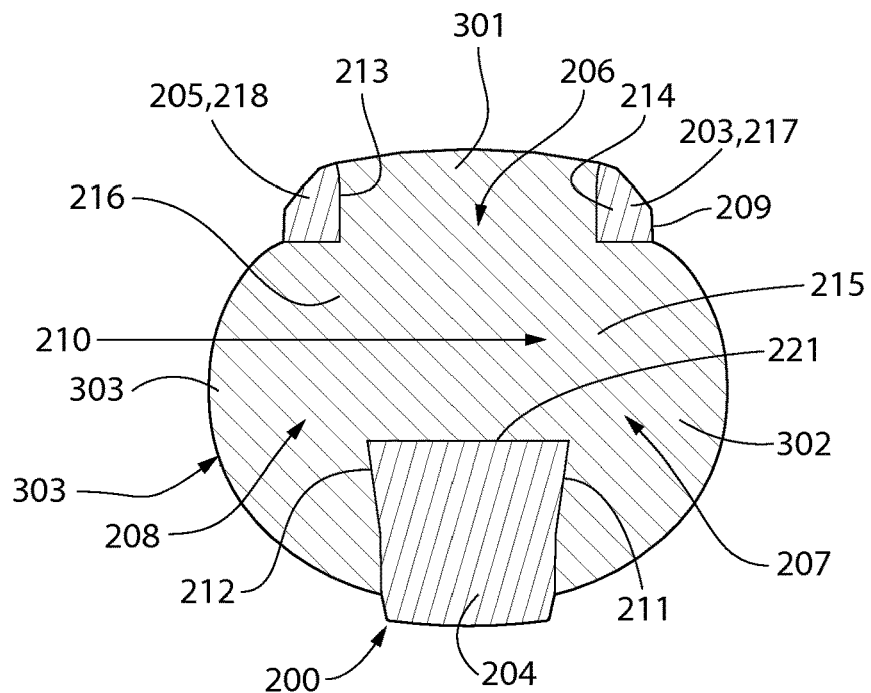
FIG. 16 is transverse cross-sectional view of the oral care implement of FIG. 1 taken along view XVI-XVI of FIG. 3.
Figure 17:
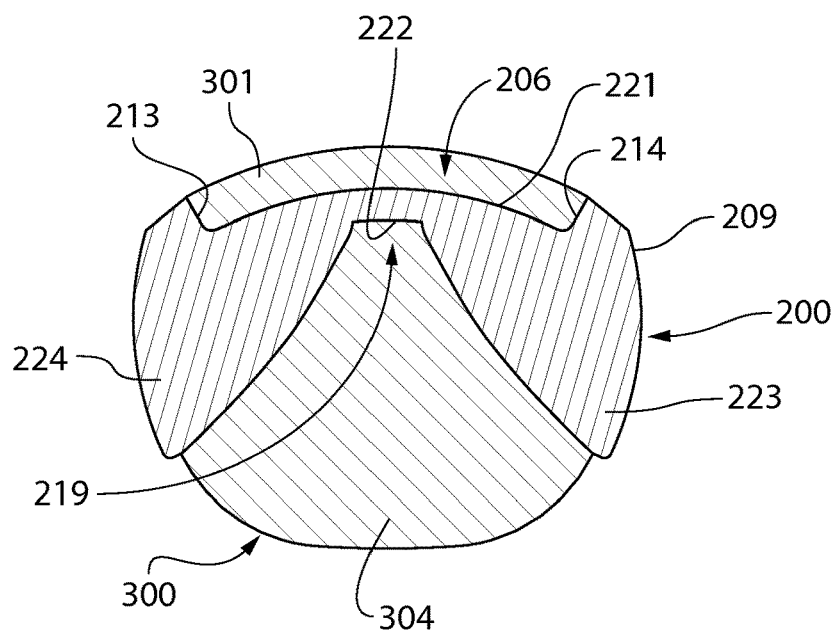
FIG. 17 is transverse cross-sectional view of the oral care implement of FIG. 1 taken along view XVII-XVII of FIG. 3.

The first, second and third depressions 206-208 are circumferentially spaced-apart from one another about the longitudinal axis A-A (see FIG. 15). The first depression 206 is located on the front side of the outer surface 209 of the first component 200. The second depression 207 is located on the right side of the outer surface 209 of the first component 200. The third depression 208 is located on the left side of the outer surface 209 of the first component 200. In certain other embodiments, the first, second and third depressions 206-208 may be located at different locations on the first component 200.

In the exemplified embodiment, each of the first, second and third depressions 206-208 are longitudinally elongated. In other embodiments, the first, second and third depressions 206-208 can take on other shapes and/or configurations.

The first component 200 further comprises a first through-hole 210 extending from a floor 211 of the second depression 207 to a floor 212 of the third depression 208. The first through-hole 210 extends through sidewalls 213, 214 of the first depression 206, thereby spatially connecting the first, second and third depressions 206-208. The first through-hole 210 forms a first gap 215 in the sidewall 214 of the first depression 216, thereby creating a first bridge portion 217 in the first longitudinal rib 203. The first through-hole 210 also forms a second gap 216 in the sidewall 213 of the first depression 216, thereby creating a second bridge portion 218 in the third longitudinal rib 205. The first gap 215 is located beneath the first bridge portion 217 and the second gap 216 is located beneath the second bridge portion 218. Each of the first and second bridge portions 217, 218 are arched in the exemplified embodiment. In certain other embodiments, each of the first and second bridge portions 217, 218 may be linear.

In the exemplified embodiment, the first component 200 further comprises a fourth depression 219 formed into the outer surface 209 of the first component 200. As exemplified, the fourth depression 219 is longitudinally elongated. In other embodiments, however, the fourth depressions 219 may take on other shapes and/or configurations. The first and fourth depressions 206, 219 are located on opposite sides of the outer surface 209 of the first component 200, which in the exemplified embodiment are the front side and rear side respectively.

The first component 200 also comprises a third through-hole 220 that extends from a floor 221 of the first depression 206 to a floor 222 of the fourth depression 219. The third through-hole 220 results in the first and fourth depressions 206, 219 being in spatial communication with one another. In the exemplified embodiment, the second longitudinal rib 204 branches into a first rib section 223 and a second rib section 224. The first rib section 223 converges with the first longitudinal rib 203 and the second rib section 224 converges with the third longitudinal rib 205. The fourth depression 219 is located between and formed by the first and second rib section 223, 224 of the second longitudinal rib 204. As can also be seen, the first and third longitudinal ribs 203, 25 also converge at the proximal end 101 of the handle 110. While the exemplified embodiment of the first component 200 comprises the fourth depression 219, the fourth depression 219 may be omitted in certain other embodiments.

The first component 200 further comprises a second through-hole 225 extending through the body portion 201 of the first component 200. As discussed in greater detail below, the second through-hole 225 is provided to receive the third component 400 in embodiments where such a third component 400 is desired. The second through-hole 225 extends from the front side of the outer surface 209 of the first component 200 to the rear side of the outer surface 209 of the first component 200. In the exemplified embodiment, the second through-hole has a cross-sectional area that tapers with increasing depth from the opposing front and rear sides of the outer surface 209 of the first component 200. As a result an apex edge 226 is formed that is embedded by the third component 400 within the handle 110. This structure assists with retaining the third component 400 within the second through-hole 225. In other embodiments, however, the cross-sectional area of the second through-hole 225 may be substantially constant, may be stepped, or may increase and/or decrease in a repetitive manner.

As exemplified, the first through-hole 210 extends transverse to the longitudinal axis A-A in a first transverse direction. The second through-hole 225 extends transverse to the longitudinal axis A-A in a second transverse direction that is substantially perpendicular to the first transverse direction. The third through-hole 220 extends longitudinally relative to the longitudinal axis A-A. In certain other embodiments, the first, second and third through-holes 210, 225, 220 may take on other orientations and/or arrangements.

Referring now to FIGS. 10-17 concurrently, the second component 300 and its structural cooperation with the first component 200 will be described in greater detail. The second component 300 generally comprises a first portion 301, a second portion 302, a third portion 303, and a fourth portion 304. In the exemplified embodiment, each of the first, second, third and fourth portions 301-304 are elongated lobe portions. In certain other embodiments, the first, second, third and fourth portions 301-304 may take on other shapes and configurations, such as polygonal, irregular-shaped, strip-like, or combinations thereof. The shape of the first, second, third and fourth portions 301-304, in the exemplified embodiment, corresponds to the shape (and volume) of the first, second, third and fourth depression 206-208, 219 respectively.

When the handle 110 of the toothbrush 100 is assembled, the first portion 301 of the second component 300 is disposed within the first depression 206 of the first component 200. The second portion 302 of the second component 300 is disposed within the second depression 207 of the first component 200. The third portion 303 of the second component 300 is disposed within the third depression 208 of the first component 200. The fourth portion 304 of the second component 300 is disposed within the fourth depression 219 of the first component 200. In the exemplified embodiment, each of the first, second, third and fourth portions 301-304 of the second component 300 are connected together to form an integral mass of the second material of which the second component 300 is constructed. The formation of such an integral mass is afforded by the existence of the first and third through-holes 210, 220 of the first component 200 which, as discussed above, result in all of the first, second, third and fourth depressions 206, 207, 208, 219 being in spatial communication with one another. As a result, the second material of which the second component 300 is constructed extends through the first and third through-holes 210, 220, thereby connecting each of the first, second, third and fourth portions 301-304 of the second component 300 together to form said integral mass. The second component 300 thus fills the first and third through-holes 210, 220 when the handle 110 of the toothbrush 100 is assembled (including the first and second gaps 216, 217.

Of note, the first portion 301 of the second component 300 comprises a collar section 305 that wraps around a rim 227 (FIG. 6) of the first component 200 that circumscribes the second-through hole 225. The rim 227 separates the collar section 305 of the second component 300 from the third component 400 when the handle 110 of the toothbrush 100 is assembled.

Turning now to FIGS. 1-2, 4-5 and 14 concurrently, the third component 400 will be described in greater detail. The third component 400 is a generally bulbous shaped body that bulges out of the second-through hole 225 of the first component 200. The third component 400 fills the second through-hole 225 of the first component 200 and, thus, takes on the shape of the second through-hole 225. The third component 400 has a convex front surface 471 and a convex rear surface 472, which resemble an oval or elliptical shape. The bulbous shape of the third component 400 enables the user to reliably roll and control the handle 110 between the thumb and index fingers during use. The third component 400 may also be non-bulging or have any number of shapes, such as circular, a true oval shape and the like.

In one preferred construction, the third component 400 has a multiplicity of finger grip protrusions 473 projecting from the front and rear surfaces 471, 472. The finger grip protrusions 473 provide a tactile feature to increase the friction on the user's finger surfaces and thus enhance the user's ability to grip the handle 110, particularly under wet conditions. The finger grip protrusions 473 are preferably provided in a desired conical or frusto-conical shape for improved grip performance. In other embodiments, other roughened surfaces and geometries could be used.

Referring now to FIGS. 1-3, each of the first, second, third and fourth portions 301-304 of the second component 300 have an outer surface 306-309 (respectively) that remain exposed when the handle 110 of the toothbrush 100 is fully assembled. In the exemplified embodiment, the outer surfaces 306-309 of the first, second, third and fourth portions 301-304 are isolated from one another by the outer surface 209 of the first component 200. This is achieved, at least in part, by each of the first, second and third longitudinal ribs 203-205 comprising a top surface 230-232 (which is a part of the outer surface 209) that remains exposed when the handle 110 is fully assembled. In other certain embodiments, the outer surfaces 306-309 of the first, second, third and fourth portions 301-304 may not be isolated from one another by the outer surface 209.

A method of manufacturing the toothbrush 100 according to one embodiment of the present invention will be described. The first component created in manufacturing the toothbrush 100 is the first component 200. To create the first component 200, a first mold is provided having a first mold cavity and at least one port/nozzle for injecting the first hard plastic in a liquefied state into the first mold cavity. In one embodiment, a single port is used to inject the liquefied first hard plastic, which may be an opaque PP. The first mold cavity has a volume that is sized and shaped to correspond to the first component 200 as described above and illustrated herein. The first mold may be two-part mold, as is known in the art. Once the first mold cavity is created/provided, liquefied first hard plastic is injected into the first mold so as to fill the first mold cavity. The liquefied first hard plastic is allowed to cool to an appropriate temperature so as to form the first component 200, as described above and illustrated herein, for further handling.

Once the first component 200 is created (and allowed to adequately cool for further handling), the first component 200 is supported by one or more clamping members that engage one or more points of contact on first component 200 with at least one set of arms.

Once the clamping member is properly supporting the first component 200, the first component 200 is positioned within a second mold cavity of a second mold. This positioning can be effectuated by either moving the first component 200 into the second mold cavity or by creating the second mold cavity about the first component 200 while supporting the first component 200 in a stationary manner, which can be accomplished by translating and mating multiple pieces of the second mold into position so that the second mold cavity is formed about the first component 200. The second mold cavity has a volume that is sized and shaped to correspond to the second component 300. One or more ports are present in the second mold for injecting the second hard plastic in a liquefied state into the second mold cavity. In one embodiment, a single port is used to inject the liquefied first elastomeric material.

Once the first component 200 is in proper position within the second mold cavity (and the second mold cavity is adequately sealed), the liquefied first elastomeric material (which may be a first TPE) is injected into the second mold cavity so as to fill the remaining volume of the second mold cavity that is not occupied by the first component 200. The liquefied first elastomeric material forms the second component 200 on (and within) the first component 200 (as described above).

The liquefied first elastomeric material is then allowed to cool to an appropriate temperature, thereby forming the second component 300 on (and within) the first component 200, as described above. The first component 200 and second component 300 collectively form a handle assembly. If the first and second plastics are selected so as to be chemically compatible with one another, the first elastomeric material of the second component 300 chemically bonds with the first hard plastic of the first component 400 during the injection molding process.

Once the handle assembly is sufficiently cool for further handling, at least the middle section 116 is positioned within a third mold cavity of a third mold. When in the third mold cavity, the second elastomeric material in a liquefied state is injected therein to fill the second through-hole 225, which is enclosed by an appropriate mold, via a port. The second elastomeric material, in one embodiment, chemically bonds with the first hard plastic of the first component 200 during this injection molding process.

In certain embodiments, the formation of the third component 400 within the second through-hole 225 of the first component 200 may be accomplished in the second mold, thereby eliminating the need for a third mold.

The inventive aspects discussed above may be practiced for a manual toothbrush or a powered toothbrush. In operation, the previously described features, individually and/or in any combination, may improve the control, grip performance, aesthetics and cost point of oral implements. Other constructions of toothbrush are possible. For example, the head 120 may be replaceable or interchangeable on the handle 110. The head 120 may include various oral surface engaging elements, such as inter-proximal picks, brushes, flossing element, plaque scrapper, tongue cleansers and soft tissue massages. While the various features of the toothbrush 100 work together to achieve the advantages previously described, it is recognized that individual features and sub-combinations of these features can be used to obtain some of the aforementioned advantages without the necessity to adopt all of these features in an oral care implement.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care implement comprising:
   a handle extending from a proximal end to a distal end along a longitudinal axis;
   a head at the distal end of the handle;
   the handle comprising a first component constructed of a first material and a second component constructed of a second material;
   the first component comprising:
      first, second and third longitudinally elongated depressions formed into an outer surface of the first component, the first, second and third longitudinally elongated depressions circumferentially spaced-apart from one another about the longitudinal axis; and
      a first through-hole extending from the second longitudinally elongated depression to the third longitudinally elongated depression, the first through-hole extending through the first longitudinally elongated depression; and
   the second component comprising:
      a first lobe portion disposed within the first longitudinally elongated depression, a second lobe portion disposed within the second longitudinally elongated depression, and a third lobe portion disposed within the first third longitudinally elongated depression; and
      the first, second and third lobe portions connected together to form an integral mass of the second material.

2. The oral care implement according to claim 1 wherein the first through-hole extends from a floor of the second longitudinally elongated depression to a floor of the third longitudinally elongated depression, the first through-hole extending through opposing sidewalls of the first longitudinally elongated depression.

3. The oral care implement according to claim 2 wherein the first through-hole extends transverse to the longitudinal axis.

4. The oral care implement according to claim 1 wherein the first material is an opaque material and the second material is a transparent material.

5. The oral care implement according to claim 1 wherein the first material is a first hard material and the second material is a first elastomeric material.

6. The oral care implement according to claim 1 wherein the first component comprises the head.

7. The oral care implement according to claim 1 wherein the first component further comprises:
   a body portion;
   a first longitudinal rib extending from the body portion toward the proximal end of the handle, the first longitudinal rib separating the first and second depressions;
   a second longitudinal rib extending from the body portion toward the proximal end of the handle, the second longitudinal rib separating the second and third depressions; and a third longitudinal rib extending from the body portion toward the proximal end of the handle, the third longitudinal rib separating the third and first depressions.

8. The oral care implement according to claim 1 wherein the handle further comprises a third component constructed of a third material, the third component disposed in a second through-hole extending through the body portion of the first component, and wherein the third component is a grip body, the third material being a second elastomeric material.

9. The oral care implement according to claim 1 wherein the first component further comprises a fourth longitudinally elongated depression formed into the outer surface of the first component, the first and fourth longitudinally elongated depressions located on opposite sides of the first component.

10. The oral care implement according to claim 9 wherein the first component comprises a third through-hole extending from a floor in the first longitudinally elongated depression to a floor of the fourth longitudinally elongate depression.

11. The oral care implement according to claim 9 wherein the second component comprises a fourth lobe portion disposed within the fourth longitudinally elongated depression, the first, second, third and fourth lobe portions connected together to form the integral mass of the second material.

12. The oral care implement according to claim 1 wherein each of the first, second and third lobe portions comprises an outer surface that remains exposed on the handle, and wherein the outer surfaces of the first, second and third lobe portions are isolated from one another by the outer surface of the first component.

13. An oral care implement comprising:
a handle extending from a proximal end to a distal end along a longitudinal axis;
a head at the distal end of the handle;
the handle comprising a first component constructed of a first material and a second component constructed of a second material;
the first component comprising:
a body portion; and
first, second and third longitudinal ribs extending from the body portion toward the proximal end of the handle; and
the second component comprising:
a first portion disposed between the first and third longitudinal ribs, a second portion disposed between first and second longitudinal ribs, and a third portion disposed between the second and third ribs.

14. The oral care implement according to claim 13 wherein the first longitudinal rib comprises a first bridge portion and the third longitudinal rib comprises a second bridge portion, and wherein a first gap exists beneath the first bridge portion and a second gap exists beneath the second bridge portion.

15. The oral care implement according to claim 13 wherein the second longitudinal rib branches into a first rib section and a second rib section, the first rib section converging with the first longitudinal rib and the second rib section converging with the second longitudinal rib, and wherein the second component comprises a fourth portion disposed between the first and second rib sections.

16. The oral care implement according to claim 13 wherein each of the first, second and third portions of the second component comprises an outer surface that remains exposed on the handle, and wherein the outer surfaces of the first, second and third portions are isolated from one another by an outer surface of the first component.

17. The oral care implement according to claim 13 wherein each of the first, second and third longitudinal ribs comprise a top surface that remains exposed on the handle.

18. The oral care implement according to claim 13 wherein the first component further comprises:
a first depression formed between the third and first longitudinal ribs;
a second depression formed between the first and second longitudinal ribs;
a third depression formed between the second and third longitudinal ribs;
a first through-hole extending from a floor of the second depression to a floor of the third depression, the first through-hole extending through opposing sidewalls of the first depression.

19. The oral care implement according to claim 13 wherein the handle further comprises a third component constructed of a third material, the third component disposed in a second through-hole extending through the body portion of the first component; and wherein the third material is a second elastomeric material.

20. An oral care implement comprising:
a handle comprising a first component constructed of a first material and a second component constructed of a second material;
the first component comprising:
first, second and third depressions formed into an outer surface of the first component; and
a first through-hole extending from a floor of the second depression to a floor of the third depression, the first through-hole extending through sidewalls of the first depression; and
the second component comprising:
a first portion disposed within the first depression, a second portion disposed within the second depression, and a third portion disposed within the third depression; and
the first, second and third portions connected together to form an integral mass of the second material.

* * * * *